(12) United States Patent
Hung

(10) Patent No.: US 6,430,630 B1
(45) Date of Patent: Aug. 6, 2002

(54) DIRECT DATA ACCESS BETWEEN INPUT AND OUTPUT PORTS

(75) Inventor: Chi-Cheng Hung, Hsinchu (TW)

(73) Assignee: Winbond Electronics Corp., Hsinchu (TW)

(*) Notice: Subject to any disclaimer, the term of this patent is extended or adjusted under 35 U.S.C. 154(b) by 0 days.

(21) Appl. No.: 09/280,747

(22) Filed: Mar. 29, 1999

(30) Foreign Application Priority Data

Jan. 26, 1999 (TW) .......................................... 88101118 A

(51) Int. Cl.⁷ ............................ G06F 13/14; G06F 13/20
(52) U.S. Cl. ............................. 710/22; 710/23; 710/27; 710/34; 710/36; 710/37; 710/51
(58) Field of Search .............................. 710/22, 27, 23, 710/36, 34, 37, 51

(56) References Cited

U.S. PATENT DOCUMENTS 4,959,860 A * 9/1990 Watters et al. .................. 380/4
5,724,609 A * 3/1998 Hatae et al. ................. 395/842

* cited by examiner

*Primary Examiner*—Jeffrey Gaffin
*Assistant Examiner*—Rehana Perveen
(74) *Attorney, Agent, or Firm*—J.C. Patents

(57) ABSTRACT

A direct input/output port access device according to the invention which can control data accesses directly between an input port and an output port. The direct input/output port access device includes a local data bus which electrically connects the input port and the output port, an input/output port read/write controller and a data bus transceiver. In a direct input/output port access operating mode, the data bus transceiver is controlled by the input/output port read/write controller to electrically separate the local data bus from a system data bus. Simultaneously, the input/output port read/write controller generates can control data accesses directly between the input port and the output port according to read/write request status signals of the output port and the input port. At this time, a microprocessor can process other operations using the system data bus.

15 Claims, 4 Drawing Sheets

DIRECT DATA ACCESS BETWEEN INPUT AND OUTPUT PORTS

CROSS-REFERENCE TO RELATED APPLICATION

This application claims the priority benefit of Taiwan application Ser. No. 88101118, filed Jan. 26, 1999, the full disclosure of which is incorporated herein by reference.

BACKGROUND OF THE INVENTION

1. Field of the Invention

The invention relates to a direct data access device, and in particular to a direct input/output port access device which can control data accesses directly between an input port and an output port.

2. Description of the Related Art

In general, data accesses to input and output ports in a computer system or a microcomputer control system are controlled by a microprocessor or by a direct memory access (DMA) controller only for individual read and write operations. Under some circumstances, a great amount of data is just required to be transmitted from one output port to another input port. In this case, it is very uneconomical to implement the above-stated operation with a resource-expensive CPU or a DMA controller.

For example, a DVD player having a DVD-ROM built therein is a typical microcomputer control system. A microprocessor included in the DVD player is mostly used to control data accesses in addition to control to internal devices's operations thereof In the DVD player, the microprocessor controls the DVD-ROM by using an input/output port and can read DVD data out through the input/output port. Except for a minor part of the read DVD data which is processed by the microprocessor and reserved, the major part of the read DVD data remains unchanged and is transmitted to a DVD decoder through an output port. On the other hand, a DMA controller can also be used to perform data accesses to the input and output ports. That is, DVD data are transmitted from the DVD-ROM to the microprocessor's memory, and then to the DVD decoder. To achieve the above-stated data transmission, the used microprocessor must have a high-performance function, or an additional DMA in coordination with a great amount of memory required. However, it is not a best design for consumer products.

SUMMARY OF THE INVENTION

In view of the above, an object of the invention is to provide a direct input/output port access device which can control data accesses directly between an input port and an output port. The direct input/output port access device of the invention includes a local data bus, an input/output port read/write controller and a data bus transceiver. The local data bus electrically connects the input port and the output port. The input/output port read/write controller is electrically connected to the output port and the input port through an output port control/status line and an input port control/status line, respectively for controlling data accesses directly between the output port and the input port through the local data bus. The data bus transceiver is electrically connected to and controlled by the input/output port read/write controller through a data bus transceiver control line for separating the local data bus from a system data bus when data accesses between the input port and the output port is in progress. Therefore, data accesses between the input port and the output port are directly controlled by the input/output port read/write controller with the local data bus electrically separated from the system data bus.

Furthermore, in the direct input/output port access device, the local data bus is used for data transmission through a system data bus or for data accesses directly between the input port and the output port. In a general operating mode, the local data bus is electrically connected to the system data bus, and therefore, the input port and the output port electrically connected thereto can receive/transmit data from/to a system's any device with the control of a microprocessor. However, in an operating mode for data accesses directly between the input port and the output port, the local data bus is electrically separated from the system data bus, and is used only for data accesses directly between the input port and the output port with the control of the input/output port read/write controller. At this time, the system data bus is still reserved for the microprocessor to implement other operations. In other words, the direct input/output port access device not only increases the data transmission rate directly between the input port and the output port one time, but also reduces the entire load of the system including the microprocessor. Accordingly, the direct input/output port access device of the invention is suitable for a great amount of data accesses required directly between the input port and the output port in a microprocessor control system or a general computer system.

BRIEF DESCRIPTION OF THE DRAWINGS

The invention will be more fully understood from the detailed description given hereinbelow and the accompanying drawings which are given by way of illustration only, and thus do not limit the present invention, wherein.

DETAILED DESCRIPTION OF THE PREFERRED EMBODIMENT

Figure 1:
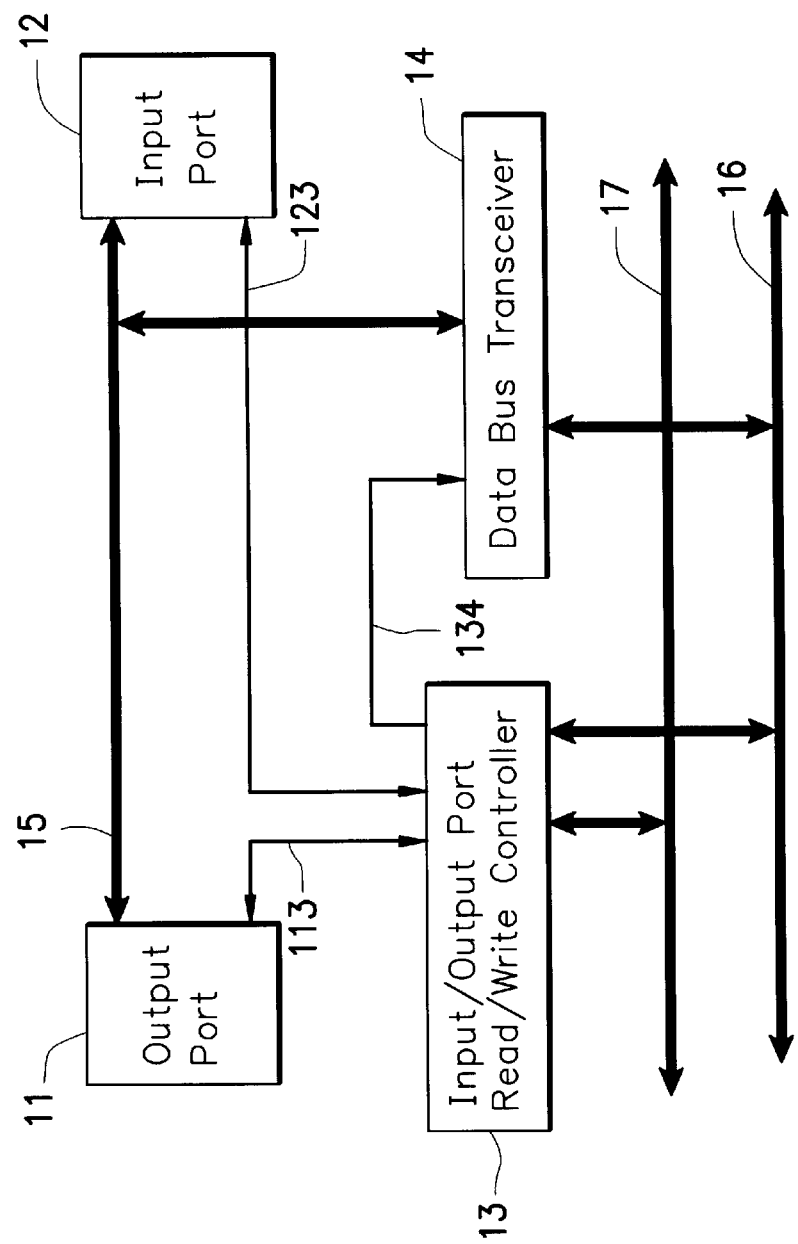
FIG. 1 is a block circuit diagram showing a direct input/output port access device according to the invention.

FIG. 1 is a block circuit diagram showing a direct input/output port access device according to the invention. The direct input/output port access device which can efficiently control data accesses directly between an output port 11 and an input port 12 includes an input/output port read/write controller 13, a data bus transceiver 14 and a local data bus 15. As shown in FIG. 1, the output port 11 and the input port 12 are electrically connected to the input/output port read/write controller 13 through an output port control/status line 113 and an input port control/status line 123. The data accesses directly between the output port 11 and the input port 12 are controlled by the input/output port read/write controller 13 through the output port control/status 113 and the input port control/status 123 which are used to transmit operating status signals from the output port 11 and the input port 12 to the input/output port read/write controller 13. These operation status signals can be activating request signals or status signals showing how many number of data are stored in internal buffers of the output port 11 and the input port 12. In an operating mode for direct data accesses, the input/output port read/write controller 13 receives signals from the output port 11 and the input port 12 to control data accesses directly therebetween. Moreover, the local data bus 15 electrically connects the output port 11 and the input port 12. The local data bus 15 is electrically connected to or separated from a system data bus 16 is determined by whether or not the data bus transceiver 14 is turned on. The data bus transceiver 14 is a general bus switch, and is controlled by the input/output port read/write controller 13 through a data bus transceiver control line 134. When the data bus transceiver control line 134 is activated, the data bus transceiver 14 is turned on to electrically connect the local data bus 15 to the system data bus 16. Inversely, when the data bus control line 134 is inactivated, the data bus transceiver 14 is turned off to electrically separate the local data bus 15 from the system data bus 16. Additionally, the input/output port read/write controller 13 is set through the system control bus 17 and the system data bus 16 to directly control the output port 11, the input port 12 and the data bus transceiver 14.

Figure 2:
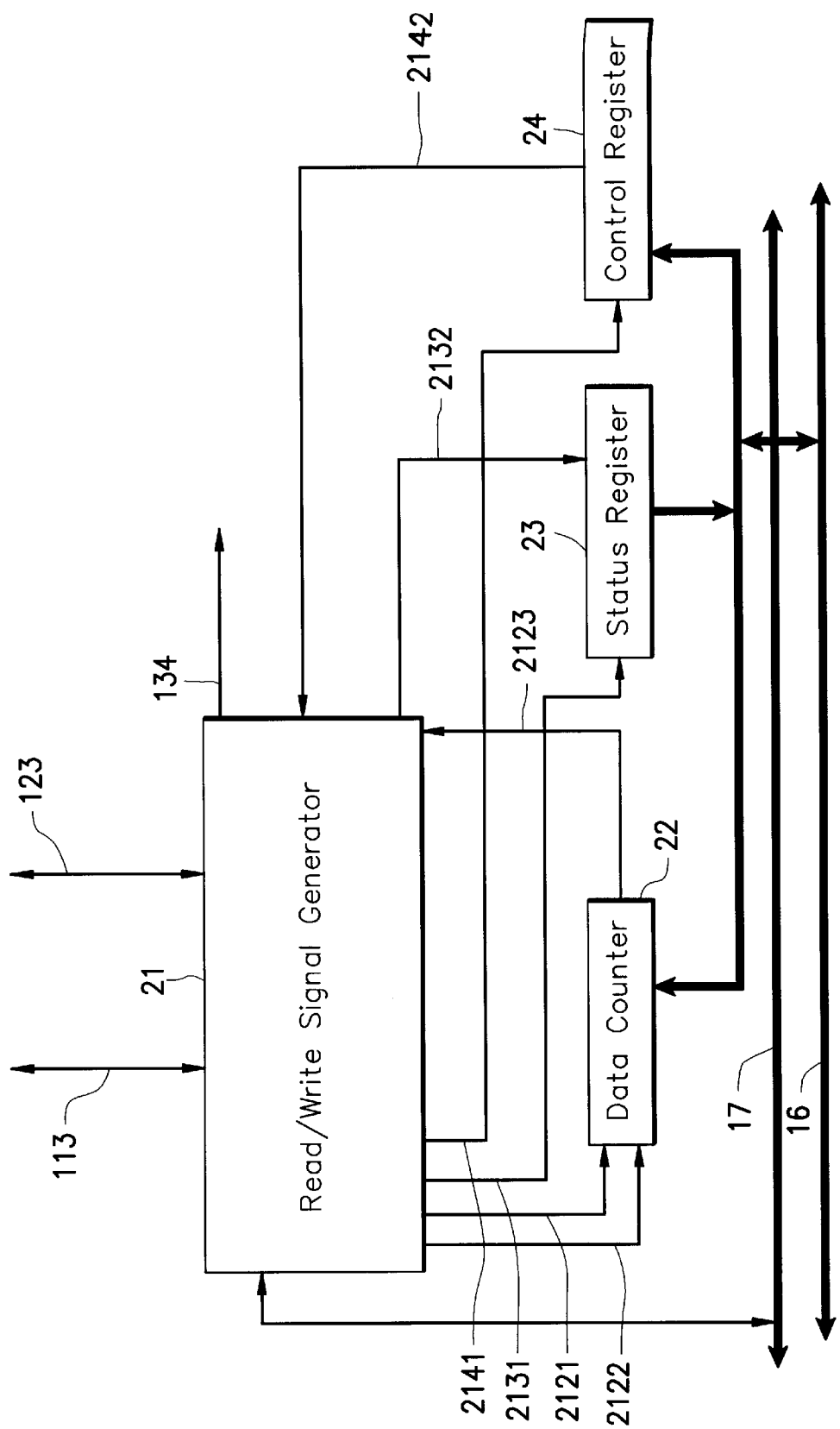
FIG. 2 is a block circuit diagram showing an input/output port read/write controller of FIG. 1.

FIG. 2 is a block circuit diagram showing the input/output port read/write controller 13 of FIG. 1. As shown in FIG. 2, the input/output port read/write controller 13 includes a read/write signal generator 21, a data counter 22, a status register 23 and a control register 24. The data counter 22, the status register 23 and the control register 24 can be directly written or read using a data counter write signal 2121, a status register read signal 2131 and a control register write signal 2141, respectively, which are generated by the read/write signal generator 21. The data counter write signal 2121, the status register read signal 2131 and the control register write signal 2141 are used to control the read/write operations of the data counter 22, the status register 23 and the control register 24. The data counter 22 is a countdown counter, and can receive an initial value from the system data bus 16. In a direct input/output port access operating mode, the data counter 22 receives a data read/write counting signal 2122 output from the read/write signal generator 21 to count how many number of data is still left for transmission. When the data counter 22 counts down the number of transmission-required data to zero, a zero-value detecting signal 2123 is generated and transmitted to the read/write signal generator 21 so as to indicate that all data required for transmission are completely achieved. The status register 23 receives an input/output port status signal 2132 output from the read/write signal generator 21 so as to record the operating statuses of the output port 11, the input port 12 and the direct input/output port access device. The control register 24 receives a setting value from the system data bus 16, and transmits a direct input/output port transmission signal 2142 to the read/write signal generator 21, thereby setting the operating mode of the direct input/output port access device. In a general operating mode, the read/write signal generator 21 controls the output port 11 and the input port 12 with the output port control/status line 113 and the input port control/status line 123 in response to control signals from the system control bus 17. Also, the read/write signal generator 21 can receive status signals from the output port 11 and the input port 12 through the input port control/status line 113 and the input port control/status line 123, and then transmit them to the system control bus 17.

Figure 3:
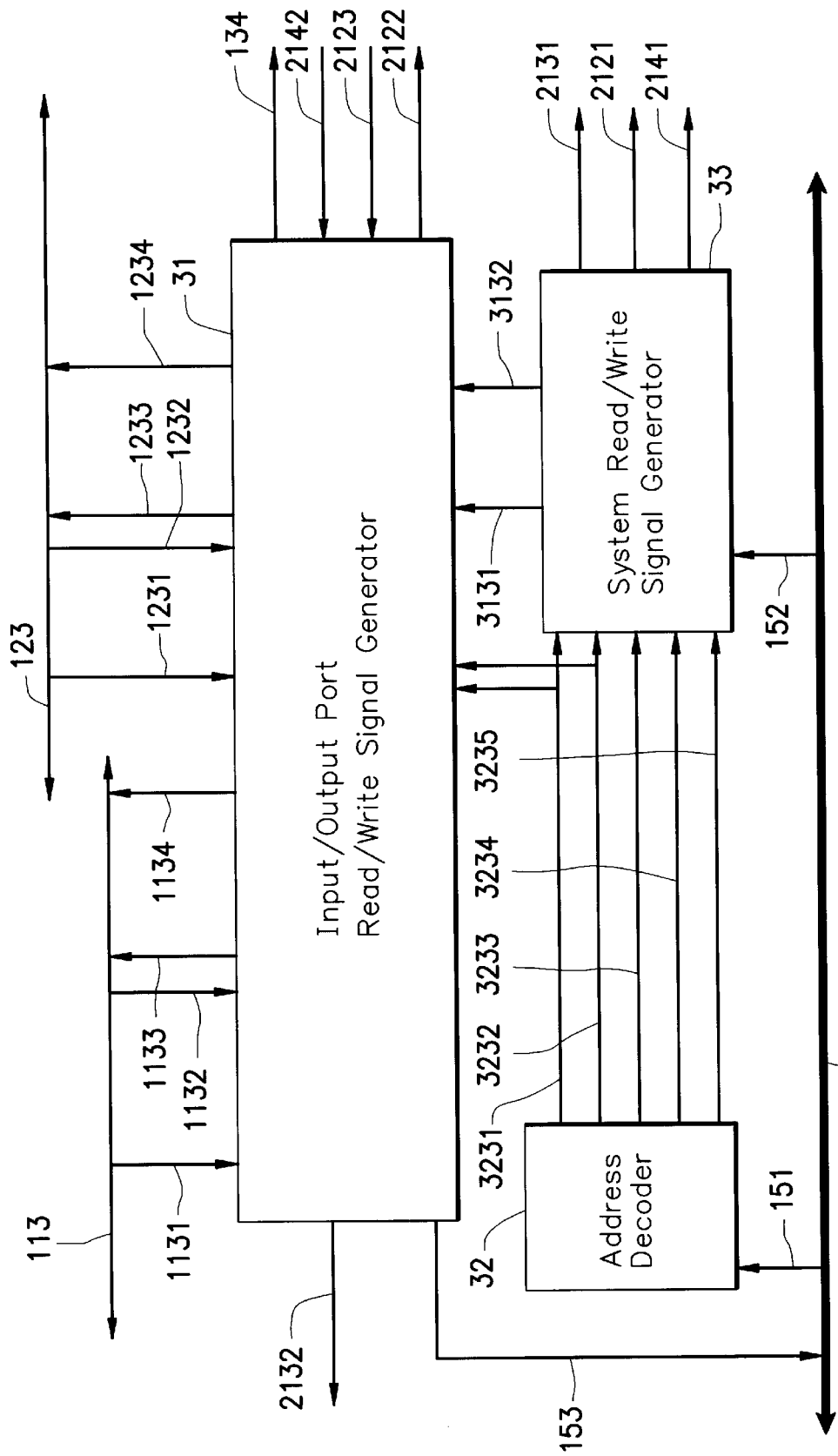
FIG. 3 is a block circuit diagram showing a read/write signal generator of FIG. 2.

FIG. 3 is a block circuit diagram showing the read/write signal generator 21 of FIG. 2. The read/write signal generator 21 includes an input/output port read/write signal generator 31, an address decoder 32 and a system read/write signal generator 33. As shown in FIG. 3, the system control bus 17 has a system address signal 151, a system read/write signal 152 and a system interrupting signal 153 transmitted thereon. The system address signal 151 is used to select input/output ports while the system read/write signal 152 is used to control the read/write operations of the selected input/output ports. The system interrupting signal 153 informs a microprocessor to process the operations of the selected input/output ports. The address decoder 32 which is a simple comparing circuit compares the value of the system address signal 151 to the address values of the output port 11, the input port 12, the status register 23, the data counter 22 and the control register 24 so as to generate an input port system selecting signal 3231, an output port system selecting signal 3232, a status register selecting signal 3233, a data counter selecting signal 3234 or a control register selecting signal 3235. The input/output port read/write signal generator 31 receives the input port system selecting signal 3231 and the output port system selecting signal 3232, and then transmits an output port selecting signal 1133 and an input port selecting signal 1233 thereby to select internal output and input units of the output port 11 and the input port 12. Furthermore, the system read/write signal generator 33 receives the selecting signals 3231, 3232, 3233, 3234 and 3235 to generate corresponding signals in coordination with the received system read/write signal 152. As an example, when the address value of the status register 23 appears in the address decoder 32, only the status register selecting signal 3233 is activated. Moreover, when the system read/write signal 152 transmitted to the system read/write signal generator 33 indicates a read operation, the status register read signal 2123 is activated. Similarly, the way to activate the output port system read/write signal 3131, input port system read/write signal 3132, the data counter write signal 2121 and the control register selecting signal 3235 is the same that to activate the status register read signal 2131. The status register read signal 2131, the data counter write signal 2121 and the control register write signal 2141 are used to control the read/write operations of the status register 23, the data counter 22 and the control register 24 of FIG. 2. The output port system read/write signal 3131 and the input port system read/write signal 3132 are transmitted to the input/output port read/write signal generator 31. Furthermore, the input/output port read/write signal generator 31 receives the output port system read/write signal 3131, the input port system read/write signal 3132, the input port system selecting signal 3231 and the output port system selecting signal 3232, and transmits an output port read/write signal 1134, an output port selecting signal 1133, an input port read/write signal 1234 and an input port selecting signal 1233 according to the operating mode thereof to control data accesses between the output port 11 and the input port 12. In addition to the above-stated signals, the input/output port read/write signal generator 31 also receives a direct input/output port transmission signal 2142 to determine the operating mode thereof and transmits a signal to the data bus transceiver control line 134 to determine whether to turn on the data bus transceiver 14 of FIG. 1 or not. When the input/output port read/write signal generator 31 generates the output port read/write signal 1134 and the input port read/write signal 1234 in a direct input/output port access operating mode, the input/output port read/write signal generator 31 also generates a data read/write counting signal 2122 to enable the data counter 22 to subtract one from the number of transmission-required data. When the value in the data counter 22 is zero, the data counter 22 transmits a zero-value detecting signal 2123 to the input/output port read/write signal generator 31, thereby stopping the direct input/output port access operation. Moreover, in the direct input/output port access operation mode, the output port read/write signal 1134 and the input port read/write signal 1234 are also determined by the output port read request (status) signal 1131 and the input port write request (status) signal 1231. In the direct input/output port access device of the invention, the system interrupting signal 153 is transmitted to the system control bus 17 from the input/output port read/write signal generator 31 according to the internal status thereof in coordination with received output port interrupting and input port interrupting signals 1132 and 1232.

Figure 4:
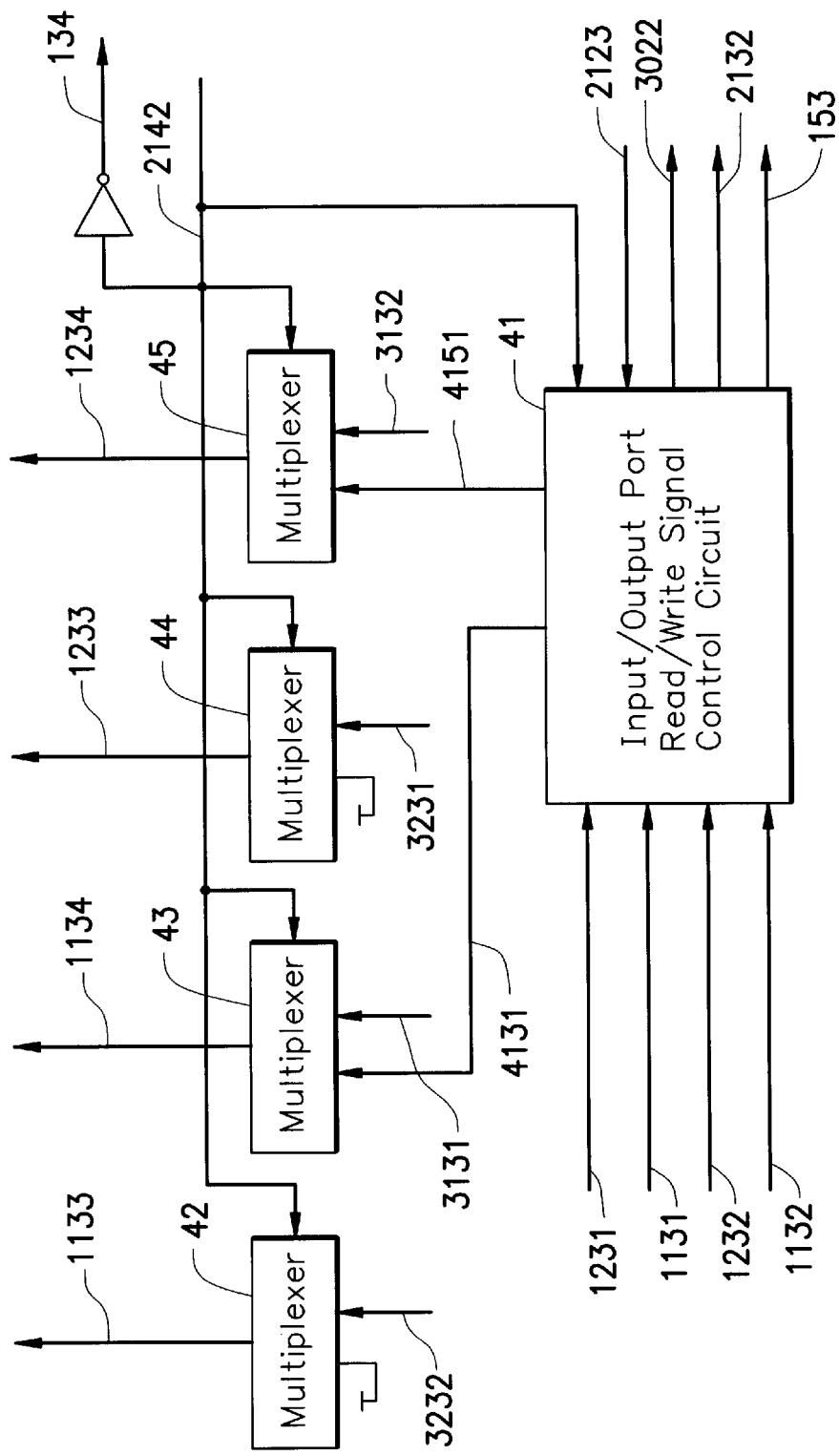
FIG. 4 is a block circuit diagram showing an input/output port read/write signal generator of FIG. 3.

FIG. 4 is a block circuit diagram showing the input/output port read/write signal generator of FIG. 3. As shown in FIG. 4, the input/output port read/write signal generator 31 includes 4 multiplexers 42, 43, 44 and 45 and an input/output port read/write signal control circuit 41. The multiplexers 42, 43, 44 and 45 are used to output the output port selecting signal 1133, the output port read/write signal 1134, the input port selecting signal 1233 and the input port read/write signal 1234, respectively. When the direct input/output port transmission signal 2142 is inactivated, the multiplexers 42, 43, 44 and 45 selects the output port system selecting signal 3232, the output port system read/write signal 3131, the input port system selecting signal 3231 and the input system read/write signal 3132 to serve as the output port selecting signal 1133, the output port read/write signal 1134, the input port selecting signal 1233 and the input port read/write signal 1234, respectively. The selected signals comes from the address decoder 32 and the system read/write signal generator 33. Moreover, when the input/output port transmission signal 2142 is inactivated, the data bus transceiver control line 134 can also be activated to turn on the data bus transceiver 14 so as to electrically connect the local data bus 15 to the system data bus 16. At this time, the data accesses to the output port 11 and the input port 12 are controlled by the system, i.e., the system implements data access to the output port 11 and the input port 12. On the contrary, when the direct input/output port transmission signal 2142 is activated, the multiplexers 42 and 44 select fixed values to serve as an output port selecting signal 1133 and the input port selecting signal 1233, thereby selecting internal units of the output port 11 and the input port 12 while the multiplexers 43 and 45 select an output port direct read signal 4131 and an input port direct write signal 4151 generated by the input/output port read/write signal control circuit 41 to serve as the output port read/write signal 1134 and the input port read/write signal 1234, respectively. Furthermore, when the direct input/output transmission signal 2142 is activated, the data bus transceiver control line 134 is inactivated to turn off the data bus transceiver 14, i.e., the local data bus 15 is electrically separated from the system data bus 16. In other words, the local data bus 15 is used only for data accesses directly between the output port 11 and the input port 12. Moreover, the system data bus 15 and the system control bus 17 can still be used by any device of the system including the microprocessor. At this time, the data accesses between the output port 11 and the input port 12 are directly controlled by the input/output port read/write signal control circuit 41. After the direct input/output port transmission signal 2142 is activated, the input/output port read/write signal control circuit 41 checks the input port write request (status) signal 1231 and the output port read request (status) signal 1131. When both the input port write request (status) signal 1231 and the output port read request (status) signal 1131 are activated, and the zero-value detecting signal 2123 is inactivated, the input/output port read/write signal control circuit 41 simultaneously activates the output port direct read signal 4131 and the input port direct write signal 4151. The two activated signals 4131 and 4151 allow data accesses directly between the output port 11 and the input port 12 through the local data bus 15. Furthermore, the data read/write counting signal 2122 which is a pulse signal can enable the data counter 22 to count down the number of transmission-required data. Once the input port write request (status) signal 1231, the output port read request (status) signal 1131 and the zero-value detecting signal 2123 do not meet the above-stated situation, the output port direct read signal 4131 and input port direct write signal 4151 are inactivated. If the direct input/output port transmission signal 2142 is activated, and the number of transmission-required data is counted down to zero by the data counter 22, it indicates that data accesses are completely achieved. At this time, the zero-value detecting signal 2123 is activated by the data counter 22 to enable the input/output port read/write signal control circuit 41 to inactivate the direct output port read signal 4131 and the direct input port write signal 4151, to output the system interrupting signal 153 and to output the input/output port status signal 2132 to inform the status register 23 of an interrupting message which indicates that all data have been completely transmitted. Moreover, when only one of the output port interrupting signal 1132 and the input port interrupting signal 1232 is activated, the system interrupting signal 153 can also be activated, and the source of the interrupting signal is recorded by the status register 23 through the input/output port status signal 2131. In a system operation, when the system interrupting signal 153 is activated, the microprocessor halts its current operation to check which one emits the system interrupting signal 153. When the microprocessor determines that the system interrupting signal 153 is generated by the direct input/output port access device, the microprocessor will further check the status register 23 thereby to determine which one of the direct input/output port access device, the output port 11 and the input port 12 generates the interrupting signal 153.

FIGS. 1, 2, 3 and 4 have already shown the detailed block circuit diagrams with regard to the direct input/output port access device of the invention. In any operating mode, all devices operate in order, wherein the operating mode can be classified into a general operating mode and a direct input/output port access operating mode.

In the general operating mode, the direct input/output port transmission signal 2142 output from the control register 24 of the input/output port read/write controller 13 is inactivated, such that the data bus transceiver control line 134 is activated to turn on the data bus transceiver 14, thereby electrically connecting the local data bus 15 to the system data bus 16. At the same time, the multiplexers 42, 43, 44 and 45 electrically connected to the output port control/status line 113 and the input port control/status 123 is controlled to select the output port system selecting signal 3232 and the output port system read/write signal 3131, the input port system selecting signal 3231 and the input port system read/write signal 3132 to serve as the output port selecting signal 1133, the output port read/write signal 1134, the input port selecting signal 1233 and the input port read/write signal 1234, respectively. In other words, the data accesses to the output port 11 and the input port 12 are directly controlled by the system. In this case, the data accesses to the output port 11 and the input port 12 are the same as those to other input/output ports controlled by the microprocessor. Additionally, the status register 23 records the internal statuses of the output port 11, the input port 12 and the read/write signal generator 21 by using the input/output port status signal 2132 output from the read/write signal generator 21. The system interrupting signal 153 can still be used to transmit the output port interrupting signal 1132 and the input port interrupting signal 1232 to the system control bus 17. Therefore, which one generates the interrupting signal can be obtained by the system only checking the status register 23. However, the data counter 22 is still inactive at this time.

If the direct input/output port access device is requested to enter the direct input/output access operating mode by the system, the number of transmission-required data of the data counter 22 is set by the microprocessor through the system control bus 17 and the system data bus 16. Then, the direct input/output port transmission signal 2142 output from the control register 24 of the input/output port read/write controller 13 is activated, such that the data bus transceiver control line 134 is inactivated to turn off the data bus transceiver 14 to electrically separate the local data bus 15 from the system data bus 16. That is, the local data bus 15 is used only for data accesses between the output port 11 and the input 12 port. At this time, the system data bus 16 and the system control bus 17 can still be provided for the use of other devices including the microprocessor. Also, the direct input/output port transmission signal 2142 controls the multiplexers 42 and 44 to each select a fixed value to serve as the output port selecting signal 1133 and the input port selecting signal 1233, respectively, thereby selecting internal unit addresses of the output port 11 and the output port 12, and controls the multiplexers 43 and 45 to select the output port direct read signal 4131 and the input port direct write signal 4151 generated by the input/output port read/write signal control circuit 41 to serve as the output port read/write signal 1134 and the input port read/write signal 1234. In other words, after the control register 24 is set to activate the direct input/output port transmission signal 2142, the data accesses between the output port 11 and the input port 12 are controlled directly by the input/output port read/write signal control circuit 41 of the input/output port read/write controller 13. That is, the direct input/output port access device enters a direct input/output port access operating mode. In the direct input/output port access operating mode, the input/output port read/write signal control circuit 41 can obtain the statuses of the output port 11 and the input port 12 according to the received output port read require (status) signal 1131 and the input port write request (status) signal 1231, and then transmit the output port direct read signal 4131 and the input port direct write signal 4151 through the output port control/status line 113 and the input port control/status line 123, respectively, thereby implementing data accesses between the output port 11 and the input port 12. At the same time, the data read/write counting signal 2122 which is a pulse signal can enable the data counter 22 to count down the number of transmission-required data so as to record how many number of data still remains for transmission. During the data accesses between the output port 11 and the input port 12, devices including the microprocessor of the system can synchronously implement other operations. Once the number of transmission-required data is counted down to zero by the data counter 22, the input/output port read/write signal control circuit 41 generates the system interrupting signal 153. The microprocessor will further check the status register 23 after receiving the system interrupting signal 153 from the system control bus 17. If the status register 23 indicates that all data have been completely transmitted. At this time, the direct input/output port access device can be set at a general operation mode by the system. If the direct input/output port access device is requested to enter the direct input/output port access operating mode again, the above-stated operations are re-implemented.

In different application systems, the direct input/output port access device according to the invention can make several modifications. As an example with a DVD-player, a DVD-ROM built therein has a direct memory access function and a data transmission counter. In this case, the data counter 22 of the direct input/output port access device can be removed. To set the direct input/output port access device as a direct input/output port access operating mode, the DVD-ROM must be set at a direct memory access mode through the input port read/write controller 13 by the system. When the DVD-ROM has been already set at a direct memory access mode, the DVD-ROM transmits the output port read request (status) signal 1131 through the output port 11, wherein the output port read request (status) signal 1131 is controlled directly by an internal data transmission counter of the DVD-ROM. When the number of transmission-required data is counted down to zero, it shows that all data have been completely transmitted. At this time, the output port read request (status) signal 1131 is inactivated to enable the input/output port read/write signal generator 31 to inactivate the output port direct read signal 4131 and the input port direct write signal 4151. Simultaneously, the output port interrupting signal 1132 is activated. Moreover, the status of output port interrupting signal 1132 is recorded in the status register 23 by the input/output port read/write signal generator 31 to activate the system interrupting signal 153. When the microprocessor detects that the system interrupting signal 153 is activated, the microprocessor will further detect the status register 23 thereby to realize that the direct input/output port access operation has been completely achieved. Similarly, the data transmission counter can also be disposed in the output port. As can be obviously known from the above, the direct input/output port access device of the invention can be applied in a practical computer system to alleviate the operation load on a microprocessor and to increase the transmission rate between input and output ports one time.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A direct input/output port access device which is suitable for use in a computer system and can control data access directly between an input port and an output port, the direct input/output port access device comprising:

a local data bus electrically connecting the input port and the output port;

an input/output port read/write controller electrically connected to the output port and the input port through an output port control/status line and an input port control/status line, respectively for controlling data accesses directly between the output port and the input port through the local data bus; and a data bus transceiver electrically connected to and controlled by the input/output port read/write controller through a data bus transceiver control line for separating the local data bus from a system data bus when data accesses between the input port and the output port is in progress.

2. The direct input/output port access device as defined in claim 1, wherein the input/output port read/write controller is electrically connected to a system control bus and the system data bus, and therefore, data accesses of the input port and the output port can be controlled by a microprocessor.

3. The direct input/output port access device as defined in claim 2, wherein the input/output port read/write controller comprises:

a read/write signal generator electrically connected to the input port, the output port, the data bus transceiver and the system control bus for controlling data accesses directly between the input port and the output port;

a status register electrically connected to the read/write signal generator and the system data bus for recording the statuses of the data input/output port access device, the output port and the input port; and a control register electrically connected to the read/write signal generator and the system data bus for controlling the operating mode of the direct input/output port access device comprising a general operating mode and a direct input/output port access operating mode.

4. The direct input/output port access device as defined in claim 3, wherein the input/output port read/write controller further comprises:

a data counter electrically connected to the read/write signal generator and the system data bus for counting the number of transmission-required data.

5. The direct input/output port access device as defined in claim 4, wherein the read/write signal generator comprises:

an input/output port read/write signal generator electrically connected to the output port, the input port, the data bus transceiver, the data counter, the status register, the control register and the system control bus for controlling data accesses directly between the output port and the input port;

an address decoder electrically connected to the input/output port read/write signal generator and the system control bus for selecting one of the output port, the input port, the data counter, the status register and the control register; and a system read/write signal generator electrically connected to the input/output port read/write signal generator, the address decoder, the data counter, the status register, the control register and the system control bus for determining the read/write operation of one of the selected output port, input port, data counter, status register and control register.

6. The direct input/output port access device as defined in claim 5, wherein the input/output port read/write signal generator comprises:

a first multiplexer electrically connected to the output port, the address decoder, the control register for selecting an internal unit of the output port;

a second multiplexer electrically connected to the input port, the address decoder and the control register for selecting an internal unit of the input port;

a third multiplexer electrically connected to the output port, the system read/write signal generator, the control register for determining whether to read the selected internal unit of the output port or not;

a fourth multiplexer electrically connected to the input port, the system read/write signal generator, the control register for determining whether to write the selected internal unit of the input port or not; and an input/output port read/write signal control circuit electrically connected to the third multiplexer, the fourth multiplexer, the output port, the input port, the data counter, the status register, the control register and the system control bus for generating and transmitting a direct output port read signal to the third multiplexer and a direct input port write signal to the fourth multiplexer.

7. A direct input/output port access device which can control data access directly between an input port and an output port, the direct input/output port access device comprising:

a local data bus electrically connecting the input port and the output port;

an input/output port read/write controller electrically connected to the output port and the input port through an output port control/status line and an input port control/status line, respectively for controlling data accesses directly between the output port and the input port through the local data bus; and a data bus transceiver electrically connected to and controlled by the input/output port read/write controller through a data bus transceiver control line so as to enable the local data bus to be used only by the input port and the output port when data accesses between the input port and the output port is in progress.

8. The direct input/output port access device as defined in claim 7, wherein the input/output port read/write controller comprises:

a read/write signal generator electrically connected to the input port, the output port and the data bus transceiver for controlling data accesses directly between the input port and the output port;

a status register electrically connected to the read/write signal generator for recording the statuses of the data input/output port access device, the output port and the input port; and a control register electrically connected to the read/write signal generator for controlling the direct input/output port access device.

9. The direct input/output port access device as defined in claim 8, wherein the input/output port read/write controller further comprises:

a data counter electrically connected to the read/write signal generator and the system data bus for counting the number of transmission-required data.

10. The direct input/output port access device as defined in claim 9, wherein the read/write signal generator comprises:

an input/output port read/write signal generator electrically connected to the output port, the input port, the data bus transceiver, the data counter, the status register and the control register for controlling data accesses directly between the output port and the input port;

an address decoder electrically connected to the input/output port read/write signal generator for selecting one of the output port, the input port, the data counter, the status register and the control register; and a system read/write signal generator electrically connected to the input/output port read/write signal generator, the address decoder, the data counter, the status register and the control register for determining the read/write operation of one of the selected output port, input port, data counter, status register and control register.

11. The direct input/output port access device as defined in claim 10, wherein the input/output port read/write signal generator comprises:

a first multiplexer electrically connected to the output port, the address decoder, the control register for selecting an internal unit of the output port;

a second multiplexer electrically connected to the input port, the address decoder and the control register for selecting an internal unit of the input port;

a third multiplexer electrically connected to the output port, the system read/write signal generator, the control register for determining whether to read the selected internal unit of the output port or not;

a fourth multiplexer electrically connected to the input port, the system read/write signal generator, the control register for determining whether to write the selected internal unit of the input port or not; and an input/output port read/write signal control circuit electrically connected to the third multiplexer, the fourth multiplexer, the output port, the input port, the data counter, the status register and the control register for generating and transmitting a direct output port read signal to the third multiplexer and a direct input port write signal to the fourth multiplexer.

12. A direct input/output port access device for use in a computer system and capable of controlling data accesses directly between an input port and an output port, comprising:

a local data bus, directlycoupled connecting between the input and the output ports;

an input/output port read/write controller, coupled to the output port and the input port, respectively for controlling the data accesses directly between the output and the input ports through the local data bus; and a data bus transceiver, coupled to and controlled by the input/output port read/write controller for separating the local data bus from a system data bus when the direct data accesses between the input and the output ports are in progress.

13. The direct input/output port access device as defined in claim 12, wherein the input/output port read/write controller comprises:

a read/write signal generator, coupled to the input port, the output port, the data bus transceiver and the system control bus coupled to the input/output port read/write controller, for controlling the data accesses directly between the input and the output ports;

a status register coupled to the read/write signal generator and the system data bus for recording statuses of the data input/output port access device, the output port and the input port;

a control register coupled to the read/write signal generator and the system data bus for controlling the operating mode of the direct input/output port access device having a general operating mode and a direct input/output port access operating mode; and a data counter coupled to the read/write signal generator and the system data bus for counting the number of transmission-required data.

14. The direct input/output port access device as defined in claim 13, wherein the read/write signal generator comprises:

an input/output port read/write signal generator coupled to the output port, the input port, the data bus transceiver, the data counter, the status register, the control register and the system control bus for controlling the data accesses directly between the output and the input ports;

an address decoder coupled to the input/output port read/write signal generator and the system control bus for selecting one of the output port, the input port, the data counter, the status register and the control register; and a system read/write signal generator coupled to the input/output port read/write signal generator, the address decoder, the data counter, the status register, the control register and the system control bus for determining the read/write operation of one of the selected output port, input port, data counter, status register and control register.

15. The direct input/output port access device as defined in claim 14, wherein the input/output port read/write signal generator comprises:

a first multiplexer coupled to the output port, the address decoder, the control register for selecting an internal unit of the output port;

a second multiplexer coupled to the input port, the address decoder and the control register for selecting an internal unit of the input port;

a third multiplexer coupled to the output port, the system read/write signal generator, the control register for determining whether to read the selected internal unit of the output port or not;

a fourth multiplexer coupled to the input port, the system read/write signal generator, the control register for determining whether to write the selected internal unit of the input port or not; and an input/output port read/write signal control circuit coupled to the third multiplexer, the fourth multiplexer, the output port, the input port, the data counter, the status register, the control register and the system control bus for generating and transmitting a direct output port read signal to the third multiplexer and a direct input port write signal to the fourth multiplexer.

* * * * *